United States Patent
Zhou et al.

(10) Patent No.: US 9,506,228 B2
(45) Date of Patent: Nov. 29, 2016

(54) QUICK-INSTALL THREE-WAY PIPE CONNECTOR

(75) Inventors: Huasong Zhou, Xiamen (CN); Haisong Peng, Xiamen (CN); Gangqiang Wu, Xiamen (CN); Boqing Lian, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 230 days.

(21) Appl. No.: 14/116,232

(22) PCT Filed: Jun. 12, 2012

(86) PCT No.: PCT/CN2012/076763
§ 371 (c)(1),
(2), (4) Date: Nov. 7, 2013

(87) PCT Pub. No.: WO2012/171453
PCT Pub. Date: Dec. 20, 2012

(65) Prior Publication Data
US 2014/0076445 A1    Mar. 20, 2014

(30) Foreign Application Priority Data
Jun. 13, 2011 (CN) .......................... 2011 1 0158189

(51) Int. Cl.
*E03C 1/04*     (2006.01)
*F16L 27/047*   (2006.01)
(Continued)

(52) U.S. Cl.
CPC ............. *E03C 1/0408* (2013.01); *E03C 1/023* (2013.01); *E03C 1/025* (2013.01); *F16K 11/22* (2013.01);
(Continued)

(58) Field of Classification Search
CPC ...... E03C 1/0408; E03C 1/025; E03C 1/023; E03C 2201/30; E03C 1/06; F16L 41/021; F16L 27/047; F16K 11/22; F16K 11/0445; F16K 11/02; Y10T 137/87804
USPC .............. 137/873, 872, 801, 118.02, 118.01, 137/625.48, 874; 4/601, 615; 251/148
See application file for complete search history.

(56) References Cited

U.S. PATENT DOCUMENTS

| | | | |
|---|---|---|---|
| 3,454,288 A * | 7/1969 | Mancusi, Jr. ................... | 285/98 |
| 4,904,228 A * | 2/1990 | Frear et al. ................... | 464/152 |
| 5,669,595 A | 9/1997 | Bytheway | |
| 7,082,626 B2 * | 8/2006 | Williams et al. ................. | 4/570 |
| 2007/0046023 A1 * | 3/2007 | Hung ............................ | 285/261 |
| 2010/0326553 A1 * | 12/2010 | Kacik et al. .................. | 137/801 |

FOREIGN PATENT DOCUMENTS

CN    201248644 Y    6/2009
CN    101773890 A    7/2010
(Continued)

OTHER PUBLICATIONS

Machine translation of CN201248644Y dated Jun. 3, 2009, accessed Aug. 20, 2015.*

*Primary Examiner* — Craig Schneider
*Assistant Examiner* — Andrew J Rost
(74) *Attorney, Agent, or Firm* — Rabin & Berdo, P.C.

(57) ABSTRACT

Quick-install three-way pipe connector with a valve body, a lower pipe assembly and a switching element. The valve body has a fitting opening, a water inlet and a lower pipe orifice; the lower pipe assembly has an on-flow pipe and a counter-flow pipe; the upper ends of the on-flow and counter-flow pipes pass through the lower pipe orifice and fix inside the valve body by an upper connector; the switching element fixes on the lower end of the on-flow and counter-flow and has a lower water outlet; the fitting opening has an upper cover sealing a water inlet cavity. The water path includes: water in-flow from a support arm joint flowing sequentially through the water inlet, the on-flow pipe, the switching element, the counter-flow pipe and the water outlet. This is simple and quick to assemble, and avoids welding a threaded part on the counter-current pipe, thus saving costs.

10 Claims, 6 Drawing Sheets

(51) Int. Cl.
    *E03C 1/02*  (2006.01)
    *F16K 11/22* (2006.01)
    *F16L 41/02* (2006.01)
(52) U.S. Cl.
    CPC ............ *F16L 27/047* (2013.01); *F16L 41/021*
                (2013.01); *E03C 2201/30* (2013.01); *Y10T
                137/87804* (2015.04)

(56) References Cited

FOREIGN PATENT DOCUMENTS

| | | |
|---|---|---|
| CN | 102367899 A | 3/2012 |
| JP | H09144910 A | 6/1997 |

* cited by examiner

QUICK-INSTALL THREE-WAY PIPE CONNECTOR

FIELD OF THE INVENTION

The present invention relates to an accessory of sanitary ware, especially to a quick-install three-way pipe connector which can couple with a standard supporting arm.

BACKGROUND OF THE INVENTION

American supporting arm is popular in some areas, it becomes a standard equipment in the domestic sanitary ware. The supporting arm is fixed in the side wall and connected to the water resource pre-installed in the wall. When in practical use, it needs to install a three-way pipe connector to the supporting arm for two extended outputs to connect higher head shower and lower hand shower.

This kind of three-way pipe connector has many kinds of structures, but they have common characters: they have a long lower pipe and a waterway switching mechanism, and the operation part of the waterway switching mechanism is usually disposed in the end of the lower pipe. The function is that the waterway is controllable in a lower position to outflow from higher head shower or lower hand shower. This kind of structure has something in common: the metal lower pipe is fixed with or welded with an internal threaded joint; the switching mechanism has complex moving element. The entire mechanism is assembled to the supporting arm, making it complicated; and the switching mechanism is complicated.

Above three-way pipe connector needs a quick and reliable structure to install the entire mechanism to the supporting arm, thus making it easy assembled and disassembled; besides it needs to save the cost and the time, such as the material to weld the threaded element to the lower pipe and the machining time.

SUMMARY OF THE INVENTION

As needed, the present invention is provided with a quick-install three-way pipe connector, the technical proposal is as below:

A quick-install three-way pipe connector, which is fixed to an support arm (400) in the wall by means of a support arm joint (210), wherein comprising:

a valve body (100), the valve body (100) comprises a fitting opening (107), a water inlet (201), a water outlet (202) and a lower pipe orifice (203), which are interconnected, the water inlet (201) is connected to the support arm joint (210);

a lower pipe assembly, which is a pipe entirely faced down, the lower pipe assembly comprises a on-flow pipe (104) and a counter-flow pipe (103), the upper ends of the on-flow pipe (104) and the counter-flow pipe (103) pass through the lower pipe orifice (203) and are fixed inside the valve body (100) by means of an upper connector (110) inserted from the fitting opening (107); and a switching element (130), the switching element (130) is fixed on the lower ends of the on-flow pipe and the counter-flow pipe and is disposed with a lower water outlet (131) which is connected to the on-flow pipe and the counter-flow pipe;

thereinto, the fitting opening (107) is disposed with an upper cover (109) to seal the valve body; the complete water path provided by the entire device comprises: water in-flow from the support arm joint (210) to flow sequentially through the water inlet (201), the on-flow pipe (104), the switching element (130), the counter-flow pipe (103) and finally the water outlet (202).

In another preferred embodiment, the valve body (100) further comprises an inlet cavity (101) and an outlet cavity (102), the fitting opening (107) is connected to the inlet cavity (101), the inlet cavity (101) is connected to the support arm joint (210) by means of the water inlet (201), then is connected to the support arm (400); the outlet cavity (102) is connected to the outside of the valve body (100) by means of the water outlet (202);

In another preferred embodiment, the upper connector (110) is connected to the on-flow pipe (104) at the inlet cavity (102), and is separated from the counter-flow pipe (103); the counter-flow pipe (103) is connected to the outlet cavity at the valve body;

In another preferred embodiment, the complete water path provided by the entire device comprises: water in-flow from the support arm joint (210) to flow sequentially through the water inlet (201), the inlet cavity (101), the upper connector (110), the on-flow pipe (104), the switching element (130), the counter-flow pipe (103), the outlet cavity (102) and finally the water outlet (202).

In another preferred embodiment, a positioning shaft (105) is disposed to pass through the upper connector (110) and the lower pipe assembly where the upper connector (110) and the lower pipe assembly are fixed.

In another preferred embodiment, the counter-flow pipe (103) and the on-flow pipe (104) are disposed in a way of two-layer nested, the on-flow pipe (104) is applied with a flexible material, and is situated inside the counter-flow pipe (103).

In another preferred embodiment, the counter-flow pipe (103) and the on-flow pipe (104) are disposed in a way of two-layer nested, the counter-flow pipe (103) is applied with a flexible material, and is situated inside the on-flow pipe (104).

In another preferred embodiment, the counter-flow pipe (103) and the on-flow pipe (104) are disposed in a same pipe, the inside of the pipe is longitudinally divided into two parts.

In another preferred embodiment, the upper joint (110) is disposed with an axial throughout hole; one end of the upper joint is disposed with an annular flange (111), the other end is disposed with an upper on-flow pipe orifice (112) inserted inside the on-flow pipe (104); the inlet cavity (101) and the outlet cavity (102) are separated in the valve body (100) by means of the annular flange (111).

In another preferred embodiment, a lower joint (120) is disposed between the on-flow pipe (104), the counter-flow pipe and the switching element (130), the lower joint (120) is disposed with a lower on-flow pipe orifice (121) inserted inside the on-flow pipe (104) and a lower counter-flow pipe hole (122) connected to the counter-flow pipe (121).

In another preferred embodiment, the switching element (130) is disposed with a switching valve inside to cut off the water route of the lower on-flow pipe orifice (121) and the lower counter-flow pipe hole (122).

In another preferred embodiment, the supporting arm joint (210) comprises:

a water element (211) and a threaded ball head (214), the water element (211) and the ball head (214) have a complete water route in the entire body; one end of the water element (211) is threaded and fixed to the supporting arm (400);

a nut (212), a bush (213) and a spheric washer (215), the nut (212) is movably coupled to the spheric washer (215) by means of the ball head (214), the nut (212) is fixed inside the water inlet (201) of the valve body (100);

thereinto, the water element, the ball head, the water inlet and the inlet cavity have a complete water route.

The technical advantages of the present invention are that:
1. the upper joint is inserted from the fitting opening to fix the on-flow pipe and the counter-flow pipe, making the entire three-way pipe connector with simple installing, besides, it saves accessory elements like fixing thread element to the on-flow pipe and the counter-flow pipe, thus saving money and machining time.
2. the on-flow pipe and the counter-flow pipe is locked to the upper joint by means of the axial positioning shaft, with the upper cover, it saves much installing time.
3. with the supporting arm joint with a universal ball head, it is convenient when installing and using, because the entire device can freely rotate and have a certain axial deviation.
4. the double-way structure of the on-flow pipe and the counter-flow pipe makes it available to outflow from a lower device, it doesn't need more valve element to switch, the structure is simple and reliable.
5. the on-flow pipe and the counter-flow pipe are in a same pipe longitudinally divided into two parts, thus making it with less assembly elements and simple installing.

BRIEF DESCRIPTION OF THE DRAWINGS

The present invention will be further descried with the drawings and the embodiments.

DETAILED DESCRIPTION OF THE EMBODIMENTS

Figure 1:
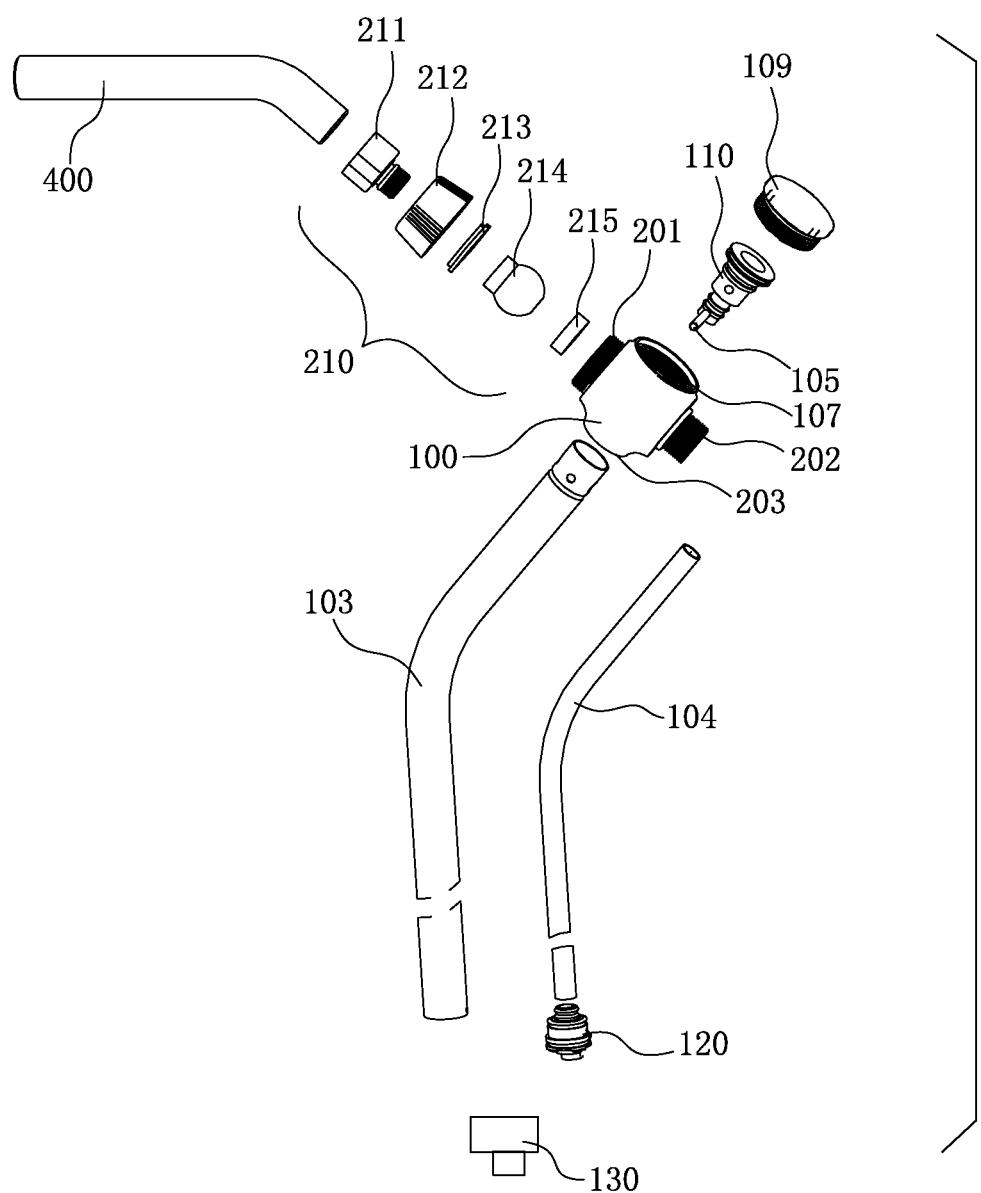
FIG. 1 illustrates a breakdown structure of the first embodiment of the present invention.
Figure 2:
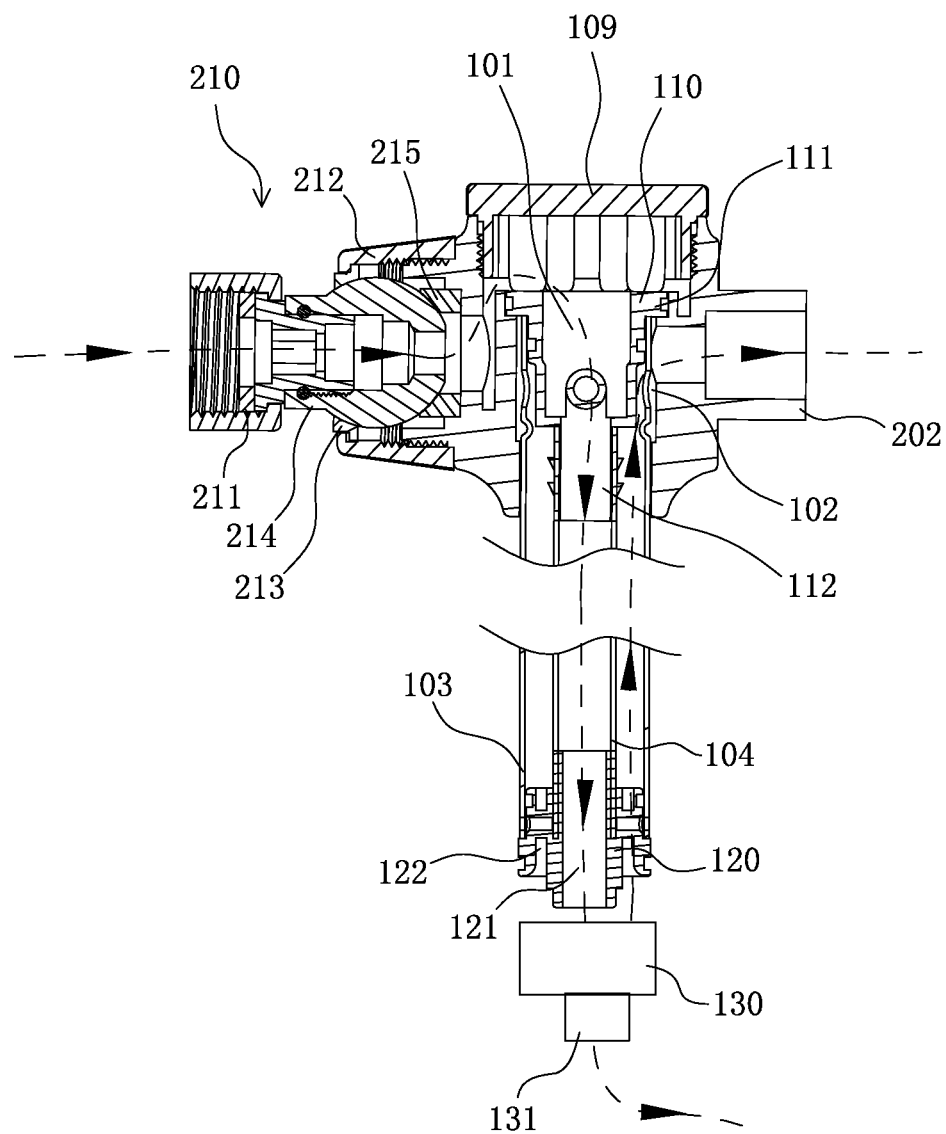
FIG. 2 illustrates a side sectional view of the first embodiment.
Figure 3:
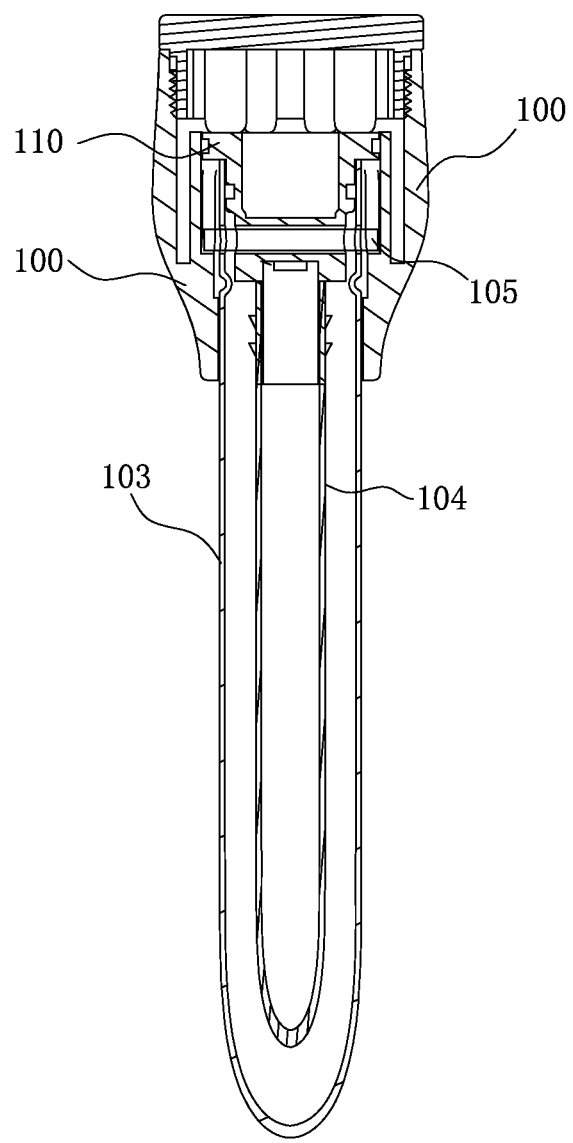
FIG. 3 illustrates a sectional view of the upper part of the first embodiment.

The First Embodiment:

As figured in FIG. 1, FIG. 2 and FIG. 3, a quick-install three-way pipe connector is provided; the supporting arm is standard equipment, and it is extended out from the side surface of the wall, it is connected to the valve body 100 by means of a supporting arm joint 210. The supporting arm joint 210 can have kinds of shapes, only if it can connect the waterway of the supporting arm 400 to the valve body 100. This embodiment is applied with a ball head 214, the supporting arm 400 is movably connected to the valve body 100 by means of a water element 211, a nut 212, a bush 213 and a spheric washer 215, thus making it applicable in many situations.

The lower pipe assembly comprises an on-flow pipe 104 and a counter-flow pipe 103. the on-flow pipe 104 is sleeved inside the counter-flow pipe 103, two pipes are equal in length, the upper ends of the two pipes are fixed by an upper joint 110, the lower ends of the two pipes are fixed by a lower joint 120. When the on-flow pipe and the counter-flow pipe are fixed by the upper joint 110 inside the valve body, an upper cover 109 is closed the valve body 100. A switching element 130 is fixed in the external of the lower joint 120.

The practical installing can be as below:

Put the on-flow pipe 104 into the counter-flow pipe 103, the lower pipe orifice 203 passes through the valve body 100; then after inserted the upper joint 110 to the on-flow pipe and the counter-flow pipe, the positioning shaft 105 locks the three in the axial direction, then pull the three back to the valve body 100 from the fitting opening 107, fix the upper cover 107 in the fitting opening to complete the assembly of the main body. Then assemble the supporting arm 400, that is to say, screw the water element 211 to the end of the supporting arm 400, fit the nut 212 and the bush 213 in the free end of the water element 211, then screw the ball head 214, finally put the spheric washer 215 between the ball head 214 and the valve body 100, and screw the nut 212 to fix the device to the supporting arm 400.

The water outlet 202 of the valve body 100 is preset to connect to a higher device, such as a head shower; the switching element 130 in the external of the lower joint 120 is used to connect to a lower device, such as a hand shower, we can do the work after the device is fixed. The internal of the switching element 130 can be a cavity, only if it can mix the outflow of the on-flow pipe and the counter-flow pipe. When the hand shower connected to the switching element 130 is turned on, water of the supporting arm 400 flows out of the lower joint 120 and the switching element 130 unobstructed, the water would not flow into the counter-flow pipe then to the water outlet 202, so that it can satisfy the needs that only the lower device is used. But in this embodiment, the switching element 130 has a valve, which can block water to flow from the lower joint 120 to go back to the valve body along the internal wall of the counter-flow pipe 103, it is more reliable to separate the higher device and the lower device, when the switching valve is turned on, and the lower device is turned off, water flows back unobstructed along the internal wall of the counter-flow pipe, then flows out of the higher device from the water outlet 202.

FIG. 2 is a side sectional view of the first embodiment. It figures the detail of the interior of the valve body. In the supporting arm joint 210, thread in the left end of the water element is coupled to and fixed to the supporting arm; after the water element 211 is fixed to the ball head 214, the bush 213 and the spheric washer 215 are used to fix and position in two directions, and then nut 212 is locked to the valve body, so that the water element 211 and the ball head 214 can freely rotate in the axial direction with respect to the valve body, and they can deviate in the axial direction in a certain range, so that it has a larger free degree when installing and using.

The interior of the valve body has two separated cavities: an inlet cavity 101 and an outlet cavity 102. The inlet cavity 101 is connected to the waterway of the supporting arm joint 210, and is connected to the on-flow pipe 104 through the hole of the upper on-flow pipe orifice 112 in the upper joint 110. the top end of the upper joint 110 is disposed with an annular flange 111, which is used to separate the inlet cavity 101, the outlet cavity 102 and the counter-flow pipe 103, when the upper cover 109 seals the valve body from the upper portion at the same time, it presses the annular flange 111 as well, so that the on-flow pipe 104 and the counter-flow pipe 103 are fixed to the valve body without dropping out.

The outlet cavity 102 is situated between the external of the counter-flow pipe 103 and the valve body, and is connected to the interior of the counter-flow pipe 103 through the hole in the wall of the counter-flow pipe 103. the outlet cavity 103 is connected to the exterior through the water outlet 202, and is used to fix higher device, such as a head shower.

The lower ends of the counter-flow pipe 103 and the on-flow pipe 104 are fixed and connected by a lower joint 120. The central of the lower joint 120 is inserted with the lower on-flow pipe orifice 121 of the on-flow pipe 104, the external periphery of the lower on-flow pipe orifice 121 is connected to the lower counter-flow pipe hole 122 of the counter-flow pipe 103. The lower on-flow pipe orifice 121 and the lower counter-flow pipe hole 122 are connected to the switching element 130, and the on-off of the lower counter-flow pipe hole 122 is controlled by the switching element 130. When the lower counter-flow pipe hole 122 is blocked, water from the on-flow pipe 104 flows out of the switching element 130, but not goes back upwards from the counter-flow pipe 103. if the switching element 130 does not block the lower counter-flow pipe hole 122, and the lower device connected to the exterior of the switching element 130 is cut off, so that water of the on-flow pipe 104 goes back from the counter-flow pipe 103 to the outlet cavity 102, then finally flows from the water outlet 202 to the higher device.

FIG. 3 is the sectional view of the upper portion of the first embodiment, it mainly shows the detail of the upper joint 110 fixing with the on-flow pipe and the counter-flow pipe. The positioning shaft 105 passes through the upper joint 110 laterally and two ends thereof are extended out to limit to the step inside the valve body 100, so that the three will not drop out from the lower part. The simple assembly not only fixes the on-flow pipe and the counter-flow pipe, it also relieves the accessory assembling structure welded to the on-flow pipe and the counter-flow pipe such as a thread element.

Figure 4:
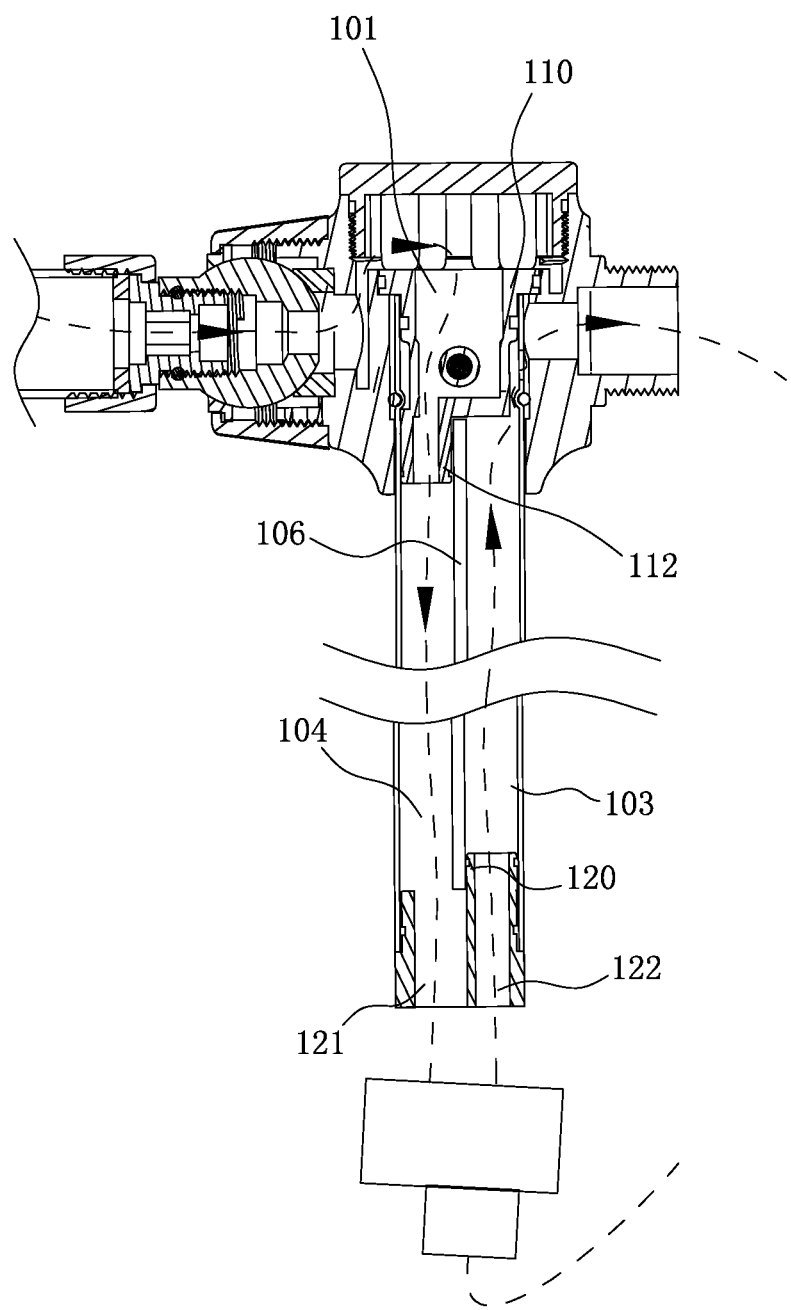
FIG. 4 illustrates a partial side sectional view of the second embodiment of the present invention.

The Second Embodiment:

As figured in FIG. 4 of a partial side sectional view of the second embodiment of the present invention. compared to the first embodiment, the on-flow pipe 104 and the counter-flow pipe 103 are not two-layer structure, but in a same pipe separated longitudinally by a separator 106; so that the upper on-flow pipe orifice 112 of the upper joint 110 is eccentric to properly insert to the on-flow pipe 104 and to make the inlet cavity 101 separated from the counter-flow pipe 103 in the valve body. Similarly, the lower joint 120 is different from the first embodiment, the lower counter-flow pipe hole 122 is not around the lower on-flow pipe 121, but both are eccentrically arranged and respectively corresponding to the counter-flow pipe and the on-flow pipe. In this embodiment, the on-flow pipe 104 and the counter-flow pipe 103 are one step forming, thus reducing the assembly components and machining time.

Figure 5:
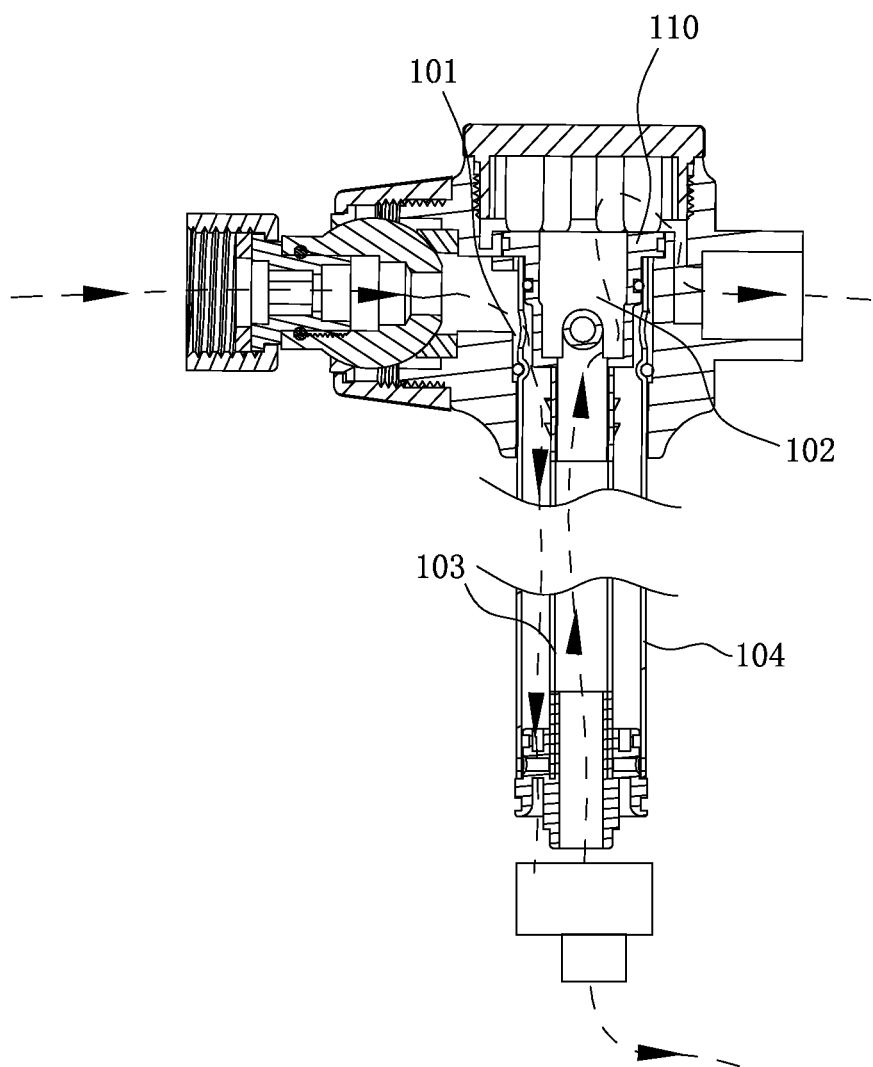
FIG. 5 illustrates a partial side sectional view of the third embodiment of the present invention.

The Third Embodiment:

As figured in FIG. 5 of a partial sectional view of the third embodiment of the present invention similar to the first embodiment, the on-flow pipe and the counter-flow pipe are two layer structure; the difference is that the counter-flow pipe 104 is placed inside the on-flow pipe 103; so that the inlet cavity 101 is situated in the exterior of the on-flow pipe and inside the valve body; the outlet cavity 102 is situated inside the upper joint 110.

Figure 6:
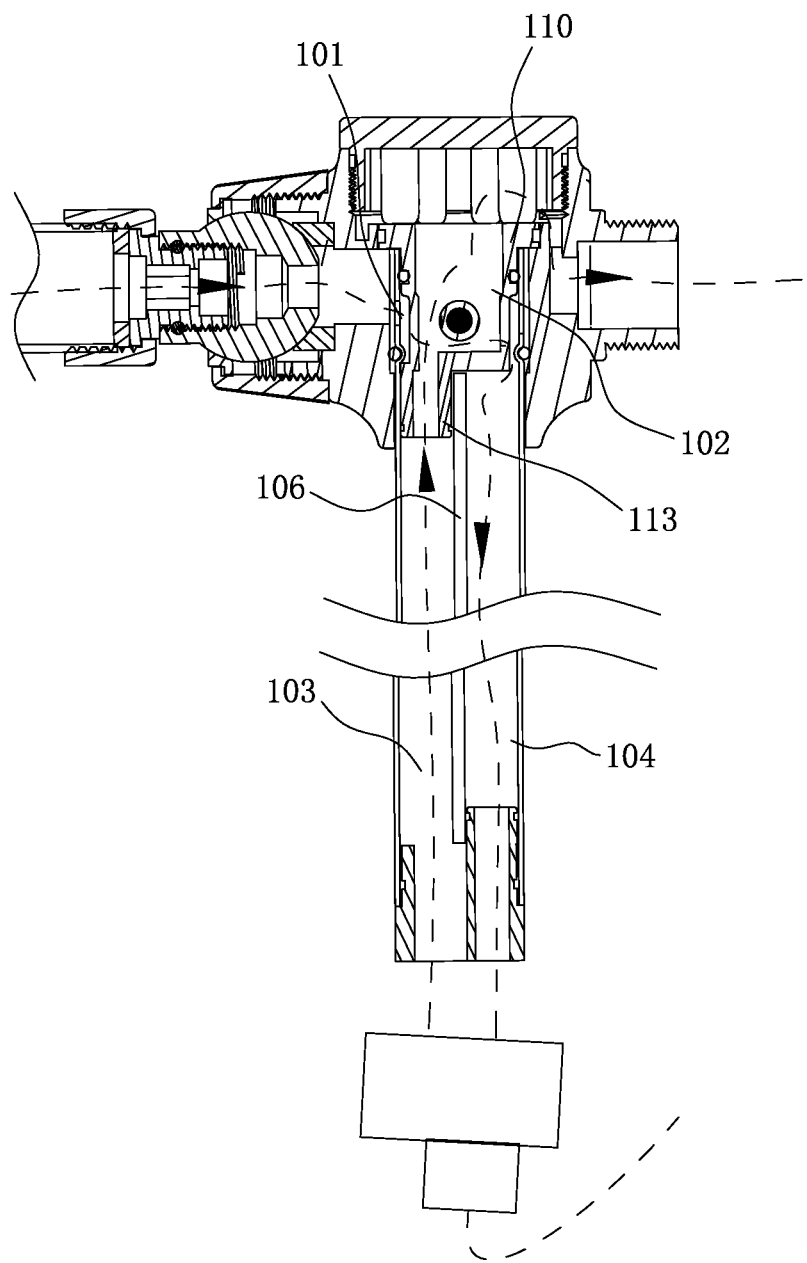
FIG. 6 illustrates a partial side sectional view of the fourth embodiment of the present invention.

The Fourth Embodiment:

As figured in FIG. 6 of a partial side sectional view of the fourth embodiment of the first embodiment. Compared to the second embodiment, the on-flow pipe 104 and the counter-flow pipe 103 are also in a same pipe separated longitudinally by a separator 106; the difference is that the upper counter-flow pipe orifice 113 of the upper joint 110 is eccentric and inserted to the counter-flow pipe 103; correspondingly, the inlet cavity 101 is annular and is situated in the exterior of the on-flow pipe and the counter-flow pipe; meanwhile, the outlet cavity 102 is situated in the interior of the upper joint 110.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a quick-install three-way pipe connector, the installing is simple, it saves accessory elements like fixing thread element to the on-flow pipe and the counter-flow pipe, thus saving money and machining time. the present invention can be widely industrial applied with well industrial applicability.

The invention claimed is:

1. A quick-install three-way pipe connector, which is fixed to the support arm (400) in a wall by means of a support arm joint (210), comprising:
    a valve body (100), the valve body (100) comprises a fitting opening (107), a water inlet (201), a water outlet (202) and a lower pipe orifice (203), which are interconnected, the water inlet (201) is connected to the support arm joint (210);
    a lower pipe assembly, which is a pipe entirely faced down, the lower pipe assembly comprises an on-flow pipe (104) and a counter-flow pipe (103), the upper ends of the on-flow pipe (104) and the counter-flow pipe (103) pass through the lower pipe orifice (203) and are fixed inside the valve body (100) by means of an upper connector (110) inserted from the fitting opening (107); and
    a switching element (130), the switching element (130) is fixed on the lower ends of the on-flow pipe and the counter-flow pipe and is disposed with a lower water outlet (131) which is connected to the on-flow pipe and the counter-flow pipe;
    wherein the fitting opening (107) is disposed with an upper cover (109) to seal the valve body; the complete water path provided by the entire device comprises: water in-flow from the support arm joint (210) to flow sequentially through the water inlet (201), the on-flow pipe (104), the switching element (130), the counter-flow pipe (103) and finally the water outlet (202),
    wherein a positioning shaft is disposed to pass through the upper connector and the lower pipe assembly where the upper connector and the lower pipe assembly are fixed.

2. A quick-install three-way pipe connector according to claim 1, wherein:
    the valve body (100) further comprises an inlet cavity (101) and an outlet cavity (102), the fitting opening (107) is connected to the inlet cavity (101), the inlet cavity (101) is connected to the support arm joint (210) by means of the water inlet (201), then is connected to the support arm (400); the outlet cavity (102) is connected to the outside of the valve body (100) by means of the water outlet (202);
    the upper connector (110) is connected to the on-flow pipe (104) at the inlet cavity (102), and is separated from the counter-flow pipe (103); the counter-flow pipe (103) is connected to the outlet cavity at the valve body;

the complete water path provided by the entire device comprises: water in-flow from the support arm joint (210) to flow sequentially through the water inlet (201), the inlet cavity (101), the upper connector (110), the on-flow pipe (104), the switching element (130), the counter-flow pipe (103), the outlet cavity (102) and finally the water outlet (202).

3. A quick-install three-way pipe connector according to claim 2, wherein the counter-flow pipe (103) and the on-flow pipe (104) are disposed in a way of two-layer nested, the on-flow pipe (104) is applied with a flexible material, and is situated inside the counter-flow pipe (103).

4. A quick-install three-way pipe connector according to claim 3, wherein the connector (110) is disposed with an axial throughout hole; one end of the upper joint is disposed with an annular flange (111), the other end is disposed with an upper on-flow pipe orifice (112) inserted inside the on-flow pipe (104); the inlet cavity (101) and the outlet cavity (102) are separated in the valve body (100) by means of the annular flange (111).

5. A quick-install three-way pipe connector according to claim 2, wherein the counter-flow pipe (103) and the on-flow pipe (104) are disposed in a way of two-layer nested, the counter-flow pipe (103) is applied with a flexible material, and is situated inside the on-flow pipe (104).

6. A quick-install three-way pipe connector according to claim 2, wherein the counter-flow pipe (103) and the on-flow pipe (104) are disposed in a same pipe, the inside of the pipe is longitudinally divided into two parts.

7. A quick-install three-way pipe connector according to claim 6, wherein the upper connector (110) is disposed with an axial throughout hole; one end of the upper joint is disposed with an annular flange (111), the other end is disposed with an upper on-flow pipe orifice (112) inserted inside the on-flow pipe (104); the inlet cavity (101) and the outlet cavity (102) are separated in the valve body (100) by means of the annular flange (111).

8. A quick-install three-way pipe connector according to claim 1, wherein a lower joint (120) is disposed between the on-flow pipe (104), the counter-flow pipe (103) and the switching element (130), the lower joint (120) is disposed with a lower on-flow pipe orifice (121) inserted inside the on-flow pipe (104) and a lower counter-flow pipe hole (122) connected to the counter-flow pipe (121).

9. A quick-install three-way pipe connector according to claim 8, wherein the switching element (130) is disposed with a switching valve inside to cut off the water route of the lower on-flow pipe orifice (121) and the lower counter-flow pipe hole (122).

10. A quick-install three-way pipe connector according to claim 1, wherein the supporting arm joint (210) comprises:
 a water element (211) and a threaded ball head (214), the water element (211) and the ball head (214) have a complete water route in the entire body; one end of the water element (211) is threaded and fixed to the supporting arm (400);
 a nut (212), a bush (213) and a spheric washer (215), the nut (212) is movably coupled to the spheric washer (215) by means of the ball head (214), the nut (212) is fixed inside the water inlet (201) of the valve body (100);
 thereinto, the water element, the ball head, the water inlet and the inlet cavity have the complete water route.

* * * * *